United States Patent [19]

Houser et al.

[11] 3,902,993

[45] Sept. 2, 1975

[54] FLOTATION SEPARATION OF CRYSTALLINE ALUMINOSILICATE ZEOLITE

[75] Inventors: Abbott F. Houser; Guenter H. Kuehl, both of Cherry Hill, N.J.

[73] Assignee: Mobil Oil Corporation, New York, N.Y.

[22] Filed: Feb. 20, 1974

[21] Appl. No.: 444,220

[52] U.S. Cl. ............................................. 209/166
[51] Int. Cl.$^2$ ........................................... B03D 1/02
[58] Field of Search ........................... 209/166, 167

[56] References Cited
UNITED STATES PATENTS

| | | | |
|---|---|---|---|
| 2,132,902 | 10/1938 | Lenher | 209/166 |
| 2,173,909 | 9/1939 | Kritcheusky | 209/166 |
| 2,310,315 | 2/1943 | Pye | 209/166 |
| 2,990,958 | 7/1961 | Greene | 209/166 |
| 3,240,556 | 3/1966 | Bhappu | 209/166 X |
| 3,282,416 | 11/1966 | Coke | 209/166 X |

*Primary Examiner*—Robert Halper
*Attorney, Agent, or Firm*—Charles A. Huggett; Raymond W. Barclay

[57] ABSTRACT

A process is provided for effecting separation by flotation of a crystalline aluminosilicate zeolite of the molecular sieve type from an aqueous salt solution, such as mother liquor, or from an aqueous slurry containing amorphous contaminant with which said zeolite is intermixed. It has been found that crystalline aluminosilicate zeolites have a specific affinity for air bubbles and rise to the surface in the froth produced during flotation and are thus separated from residual components.

8 Claims, No Drawings

FLOTATION SEPARATION OF CRYSTALLINE ALUMINOSILICATE ZEOLITE

BACKGROUND OF THE INVENTION

1. Field of the Invention

Separation of crystalline aluminosilicate zeolites of the molecular sieve type from aqueous salt solutions, e.g. mother liquor, and from amorphous materials.

2. Description of the Prior Art

Flotation processes have been used commercially in separation of lead, copper and zinc ores from each other and from coal and gangue. Such processes are based on the affinity of properly prepared surfaces for air bubbles. In froth flotation, a froth is formed by introducing air into a pulp of the finely divided ore and water containing a frothing agent. Those minerals that have a specific affinity for air bubbles rise to the surface in the froth and are thereby separated from those that are wetted by water. In utilizing flotation techniques of the type described it is necessary to coat the desired materials selectively in the presence of many other mineral species.

Filtration and centrifugation have previously been employed for separating aqueous salt solutions, e.g. mother liquor, from desired crystalline aluminosilicate zeolites. In the case of small particle size zeolites, the use of filtration is currently not practical. Centrifugation, on the other hand, necessitats a large capital expenditure and involves the use, on a commercial scale, of complicated and costly equipment. The use of the flotation process described herein overcomes these disabilities of the prior art and affords a method particularly applicable for separation of small particle size zeolites from aqueous salt solutions and/or amorphous impurities either occurring naturally or formed during the production of the synthetic crystalline aluminosilicate zeolite.

SUMMARY OF THE INVENTION

The process of this invention affords a highly effective means for separating crystalline aluminosilicate zeolites of the molecular sieve type from aqueous salt solutions containing the same, such as those solutions in which crystallization of the zeolite has taken place. The process is of particular value if the particles of the crystalline aluminosilicate zeolite are so small that they cannot be filtered and washed by filtration without major losses or if they cause filter plugging. A specific application is the separation of synthetic small size zeolite particles from their mother liquor. Soluble salts, utilizing techniques described herein, can be completely removed by repeated reslurrying of the flotation zeolite product with water and repeated flotation.

Crystalline aluminosilicate zeolites of the molecular sieve type can also be separated from amorphous solids using the process of this invention. This embodiment is of particular significance is providing means for separation of amorphous byproduct deposited during zeolite crystallization and increasing the concentration of zeolite in natural zeolite ore deposits by separation of amorphous gangue therefrom which almost invariably occurs in such deposits. The process described herein is of significant value in freeing the crystalline aluminosilicate zeolite of amorphous material or unwanted salts which could interfere with or have an adverse effect on the processing and subsequent catalytic characteristics of the zeolite.

In accordance with the invention there is provided a process for effecting separation of a crystalline aluminosilicate zeolite of the molecular sieve type from an aqueous salt solution or from an aqueous slurry containing amorphous contaminant with which the zeolite is intermixed. In a preferred embodiment where the crystalline aluminosilicate molecular sieve type zeolite is separated from an aqueous solution, such as the mother liquor, the zeolite is characterized by a particle diameter of less than about 1 micron. In general, the process entails the addition to the mixture of zeolite with aqueous salt solution or amorphous contaminant of a small amount of one or more reagents having the overall capability of functioning as a flocculant, collector and frother for the particles of zeolite and the introduction of a stream of air into the resulting composite to produce a foam or froth containing suspended particles of the zeolite. The foam so produced is collected and dried to obtain particles of the zeolite substantially free of the other components of the initial mixture. If not fully purified during the primary flotation step, the zeolite can be further treated by repeated secondary reslurrying of the flotation zeolite product with water and the flotation repeated any desired number of times.

It is contemplated that crystalline aluminosilicate zeolites of the molecular sieve type, in general, may be separated from aqueous salt solutions or amorphous materials in accordance with the process of this invention. Representative of such zeolites are zeolite A, described in U.S. Pat. No. 2,882,243; zeolite X, described in U.S. Pat. No. 2,882,244; zeolite Y, described in U.S. Pat. No. 3,130,007; zeolite ZSM-5, described in U.S. Pat. No. 3,702,886; zeolite L (U.S. Pat. No. 3,216,789), zeolite alpha (U.S. Pat. No. 3,375,205), ZK-4 (U.S. Pat. No. 3,314,752), ZK-5 (U.S. Pat. No. 3,247,195), ZSM-3 (U.S. Pat. No. 3,415,736), ZSM-11 (U.S. Pat. No. 3,709,979), zeolite T (U.S. Pat. No. 2,950,952), erionite, offretite, ZSM-12 (application Ser. No. 125,749 filed Mar. 18, 1971) and ZSM-21 (application Ser. No. 393,797 filed Sept. 4, 1973) and zeolite ZK-22, described in application Ser. No. 651,108 filed July 5, 1967, the disclosure of which is incorporated herein by reference. The latter zeolite has a crystal structure similar to zeolite A but a silica/alumina mol ratio higher than zeolite A and is prepared from a mixed sodium tetramethylammonium system containing phosphate. The composition of zeolite ZK-22 may, in its dehydrated form, be expressed in terms of appropriate mol ratios of oxides as follows:

$$1.0 \pm 2[(1-x)$$
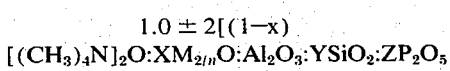
$$[(CH_3)_4N]_2O:XM_{2/n}O:Al_2O_3:YSiO_2:ZP_2O_5$$

wherein M represents a metal cation or a positive ion, $n$ is the valence thereof, Y is 2 to 7, and Z is 0.01 to (Y + 2)/48.

The process of the invention is particularly applicable in separation of small crystallite size zeolites characterized by a particle diameter of less than about 1 micron. In a specific embodiment, the technique described herein, is unusually effective in affording separation from their mother liquor of crystalline aluminosilicate zeolites, such, for example, as those of the ZSM-5 type, having an ultimate particle diameter of 0.005 to 0.1 micron as crystallized. The latter form zeolites, as described more particularly in copending application Ser. No. 330,925 filed Feb. 9, 1973, have been found to be highly desirable hydrocarbon conversion catalysts in that they retard catalyst aging during the hydrocarbon conversion reaction.

The flocculant, collector and frother added to the aqueous salt solution containing zeolite or to the aqueous slurry containing zeolite and amorphous contaminant may be separate reagents or their functions may be contained in two or even one reagent. The use of two of these reagents for the above purposes is advantageous under certain conditions in affording a higher degree of flexibility. For example, it may be desirable to counteract the foaming function only to facilitate reslurrying of the flotation product in order to conserve the reagents providing the other functions.

Representative flocculants which can be used in the process of the invention include natural and synthetic polymeric substances such as starch and polyacrylamides.

Typical flotation collectors include fatty acid soaps, alkyl sulfates, arenesulfonates, alkylarenesulfonates, primary amines, quaternary ammonium salts and alkylpyridinium salts. Frothing agents, added to form fine bubbles, are heteropolar organic substances with a hydrocarbon group at one end of the molecule and a non-hydrocarbon group at the other. Frothers differ from collectors by their nonionizable character. A moderately long-chained alcohol, ketone or ether makes a good frother. More generally, such an agent contains a properly sized hydrocarbon group to give the molecules the desired balance between the hydrophilic character of the polar group and the hydrophobic character of the hydrocarbon group.

Typical frothing agents which can be used include pine oil, creosote, cresylic acid and alcohols such as 4-methyl-2-pentanol. When the collector is an amine, soap or sulfonate, there is often no need for an additional frother. Pine oil also functions as a combined collector-frother. As noted above, the function of flocculant, collector and frother may be combined in a single reagent. Representative of such reagents, the use of which may in some aspects be considered to be a preferred embodiment, is N-cetyl, N-ethyl morphilinium ethosulfate.

The amount of flocculant, collector and frother employed as a single component or in the aggregate will generally be small but sufficient to exert its desired function. Usually, the amount of such reagent or reagents in total, based on the solids content of the mixture undergoing treatment, will be less than about 1 weight percent.

A stream of air is then introduced into the zeolite mixture containing the flocculant, collector and frother. Generally, air will be passed into such mixture with agitation for a period of time sufficient to form a froth containing suspended particles of zeolite.

The froth produced is thereafter collected and dried. The temperature of drying is not a critical factor but generally will be between about 80° and about 200°C. Upon drying of the froth, the separated and purified particles of crystalline aluminosilicate zeolite are obtained.

DESCRIPTION OF SPECIFIC EMBODIMENTS

The following examples will serve to illustrate the process of the invention without limiting the same:

EXAMPLE 1

Zeolite Y was synthesized as follows:

Sodium aluminate solution was prepared by dissolving 20.95 lbs. of sodium aluminate in 127.45 lbs. of water with stirring at ambient temperature. The sodium aluminate had the composition 41.8 percent $Al_2O_3$, 31.7 percent $Na_2O$. After dissolution, 42.80 lbs. of NaOH (100 percent) was added and dissolved. The specific gravity of this solution was 1.344 at 56°F. The sodium aluminate solution and 308.80 lbs. of colloidal silica sol containing 30 percent $SiO_2$, specific gravity 1.206, were cooled to 50°–54°F. and mixed with a nozzle at a ratio of 1.615 lbs. of colloidal silica sol to 1 lb. of sodium aluminate solution or a volume ratio of 1.447. The resulting gel was further homogenized by stirring. The pH of this gel was measured to be 13.0. The gel was aged at 60°F. for 115 hours. 3.39 lbs. of colloidal silica sol was added after 67 hours of aging, then the aging continued. Molar ratios of the mixture were:

| | |
|---|---|
| $SiO_2/Al_2O_3$ | 18.0 |
| $Na_2O/Al_2O_3$ | 7.5 |

When the aging period was over, the temperature was raised to 150°F. After 5 days. The product was 90 percent crystalline as determined by X-ray diffraction.

Mother liquor was decanted from the settled zeolite crystals in order to lower the electrolyte concentration. The remaining zeolite Y slurry was found to contain zeolite particles with an average diameter of about 0.7 micron. To a 1-liter sample of this slurry were added a few drops of N-cetyl, N-ethyl morphilinium ethosulfate.

A dispersion tube was then placed into the zeolite slurry and air was introduced therein producing a froth loaded with zeolite particles. The froth was continuously removed with simultaneous introduction of air until no further flotation occurred. The collected froth was dried. The remaining liquid was perfectly clear after residual solids settled. These solids were essentially amorphous. The zeolite separated by flotation was 100 percent crystalline compared with 90 percent crystallinity before flotation.

EXAMPLE 2

Zeolite ZSM-5 was prepared by nozzle mixing the following solutions:

A. 240 lbs. of Q-Brand sodium silicate, 28.7 percent $SiO_2$, 8.9 percent $Na_2O$, diluted with 300 lbs. of water. Specific gravity at 60°F: 1.1525.

B. 7.30 lbs. of $Al_2(SO_4)_3$, 30 lbs. of tetra-n-propylammonium bromide, 90 lbs. of sodium chloride and 20 lbs. of sulfuric acid (97.5 percent), dissolved in 410 lbs. of water. Specific gravity at 60°F: 1.1615.

The gel formed was then digested at 200°–212°F. for 8 days.

After decanting mother liquor, a 1-liter sample of the remaining aqueous slurry of zeolite ZSM-5, containing crystallites of about 0.3 micron, was subjected to contact with a stream of air after the addition of a few drops of N-cetyl, N-ethyl morphilinium ethosulfate.

Air was introduced into the slurry producing a froth loaded with zeolite particles. The frfoth was continuously removed with simultaneous introduction of air until no further flotation occurred. The collected froth was dried. The remaining liquid was perfectly clear after residual amorphous material settled.

EXAMPLE 3

A phosphatoaluminate solution was prepared by dissolving 23.8 grams of aluminum phosphate dihydrate in a mixture of 456 grams of 25 percent tetramethylammonium hydroxide solution and 69 grams of 85 percent phosphoric acid with heating. A slimy precipitate appeared, which was filtered off. A small quantity of ZK-22 seed was added to the resulting filtrate before adding a mixture of 62 grams of sodium metasilicate (24.55 $Na_2O$; 21.9 percent $SiO_2$) and 46.8 grams of waterglass (8.9 percent $Na_2O$; 28.7 percent $SiO_2$) in 180 ml. of water. The mixture was placed in a bath at 95°C. until crystallization was complete. The resulting product was identified, by X-ray diffraction analysis, as a mixture of sodalite and zeolite ZK-22.

The resulting slurry of crystalline aluminosilicates was subjected to the flotation technique described in the previous examples. Both zeolite ZK-22 and sodalite floated at the conditions employed. Amorphous material, thus separated from the crystalline material, remained as a residual solid.

While in the above examples, the mother liquor was initially decanted to reduce the electrolyte concentration, the same effect can be achieved by diluting the zeolite-mother liquor slurry with water. As such dilution can be carried out in the flotation vessel, one advantage of utilizing such technique is the elimination of large-volume holding tanks. In addition, the amount of electrolyte adhering to the zeolite particles is considerably reduced.

We claim:

1. A process for effecting separation of a crystalline aluminosilicate zeolite of the molecular sieve type from an aqueous salt solution or from an aqueous slurry containing amorphous material with which said zeolite is intermixed which comprises adding to such mixture a small amount, generally less than about 1 weight percent, based on solids content, of N-cetyl, N-ethyl morpholinium ethosulfate, introducing a stream of air into the resulting composite to produce a foam containing suspended particles of zeolite and collecting and drying the foam so produced to obtain particles of said zeolite substantially free of other components of the initial mixture.

2. The process of claim 1 wherein the particle diameter of the crystalline aluminosilicate zeolite is less than about 1 micron.

3. The process of claim 1 wherein the particle diameter of the crystalline aluminosilicate zeolite is between about 0.005 and about 0.1 micron.

4. The process of claim 1 wherein said crystalline aluminosilicate zeolite is zeolite ZSM-5.

5. The process of claim 1 wherein said crystalline aluminosilicate zeolite is zeolite Y.

6. The process of claim 1 wherein said crystalline aluminosilicate zeolite is zeolite ZK-22.

7. The process of claim 1 wherein said aqueous salt solution is the mother liquor in which crystallization of said zeolite has occurred.

8. The process of claim 1 wherein said amorphous material and said zeolite are contained in a naturally occurring ore.

* * * * *

UNITED STATES PATENT AND TRADEMARK OFFICE
CERTIFICATE OF CORRECTION

PATENT NO. : 3,902,993
DATED : September 2, 1975
INVENTOR(S) : ABBOTT F. HOUSER and GUENTER H. KUEHL It is certified that error appears in the above-identified patent and that said Letters Patent are hereby corrected as shown below:

Column 1, line 57, "is" should be --in--.

Column 2, line 40, "393,797" should be --393,767--.

Column 2, lines 54-55, "(Y+2)/48" should be --Y+Z/48--.

Signed and Sealed this thirteenth Day of January 1976

[SEAL]

Attest:

RUTH C. MASON
Attesting Officer

C. MARSHALL DANN
Commissioner of Patents and Trademarks